April 27, 1965  P. H. KNOTT  3,180,054
ANIMATED DOLL'S FACE
Filed Aug. 27, 1963  5 Sheets-Sheet 4
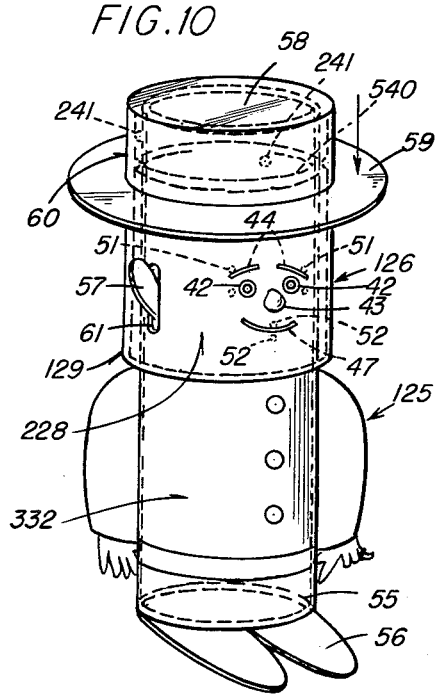
FIG.10
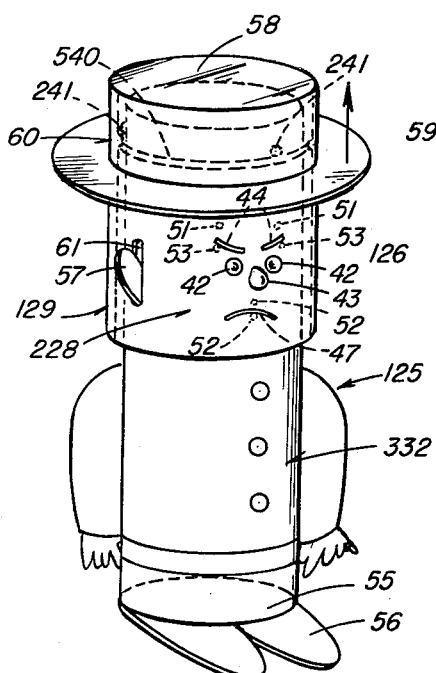
FIG.11
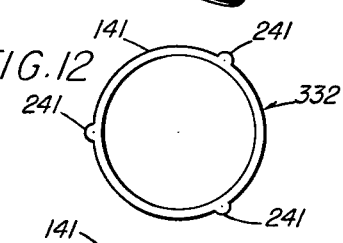
FIG.12
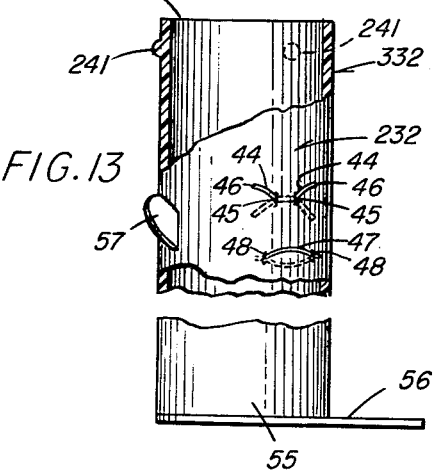
FIG.13
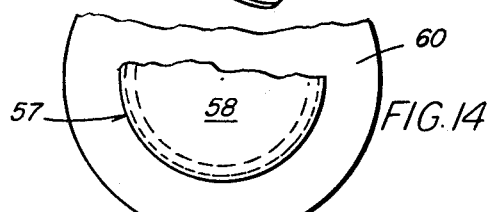
FIG.14
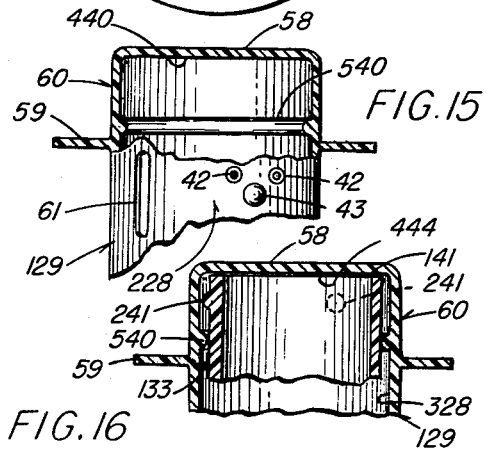
FIG.15
FIG.16

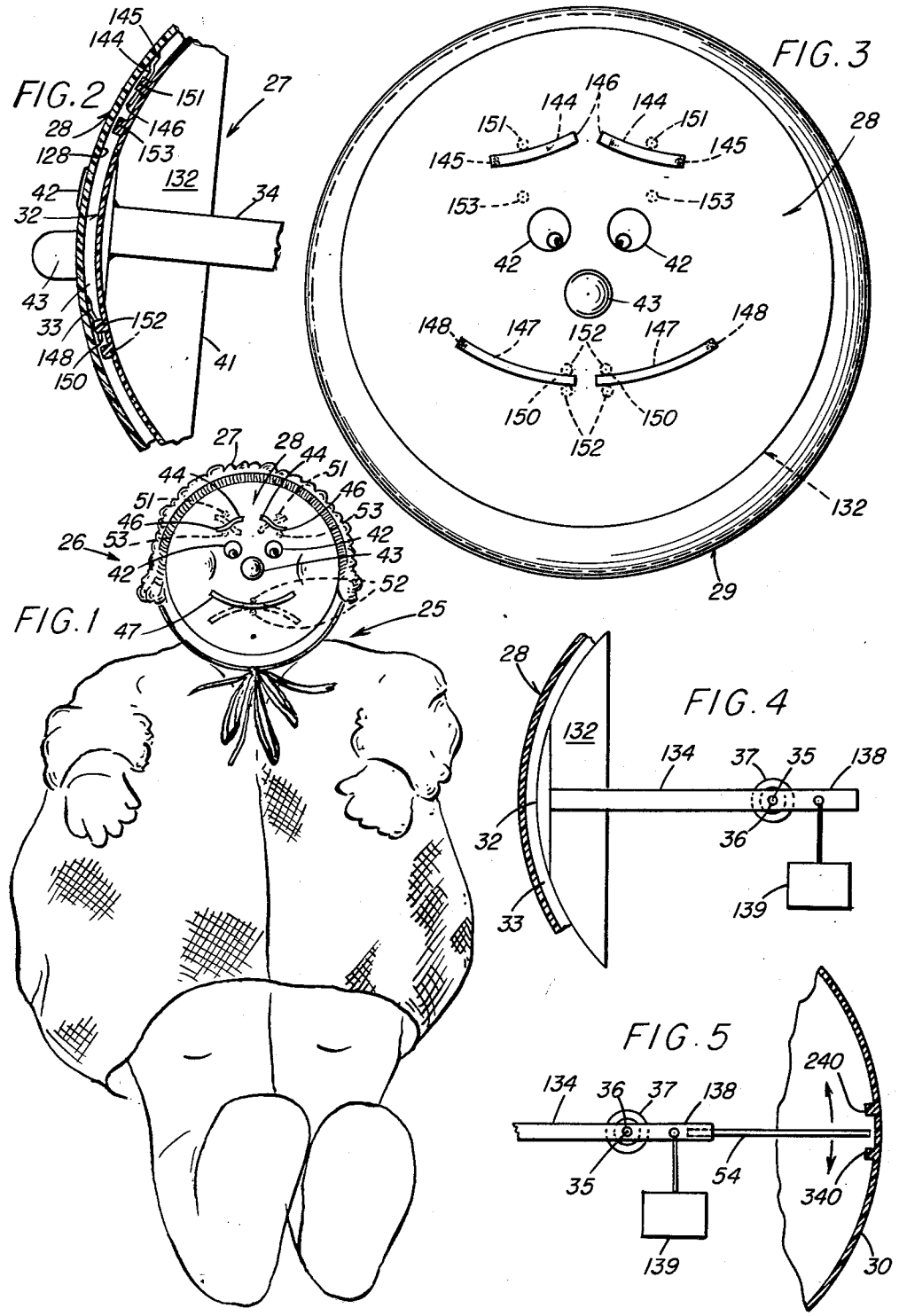

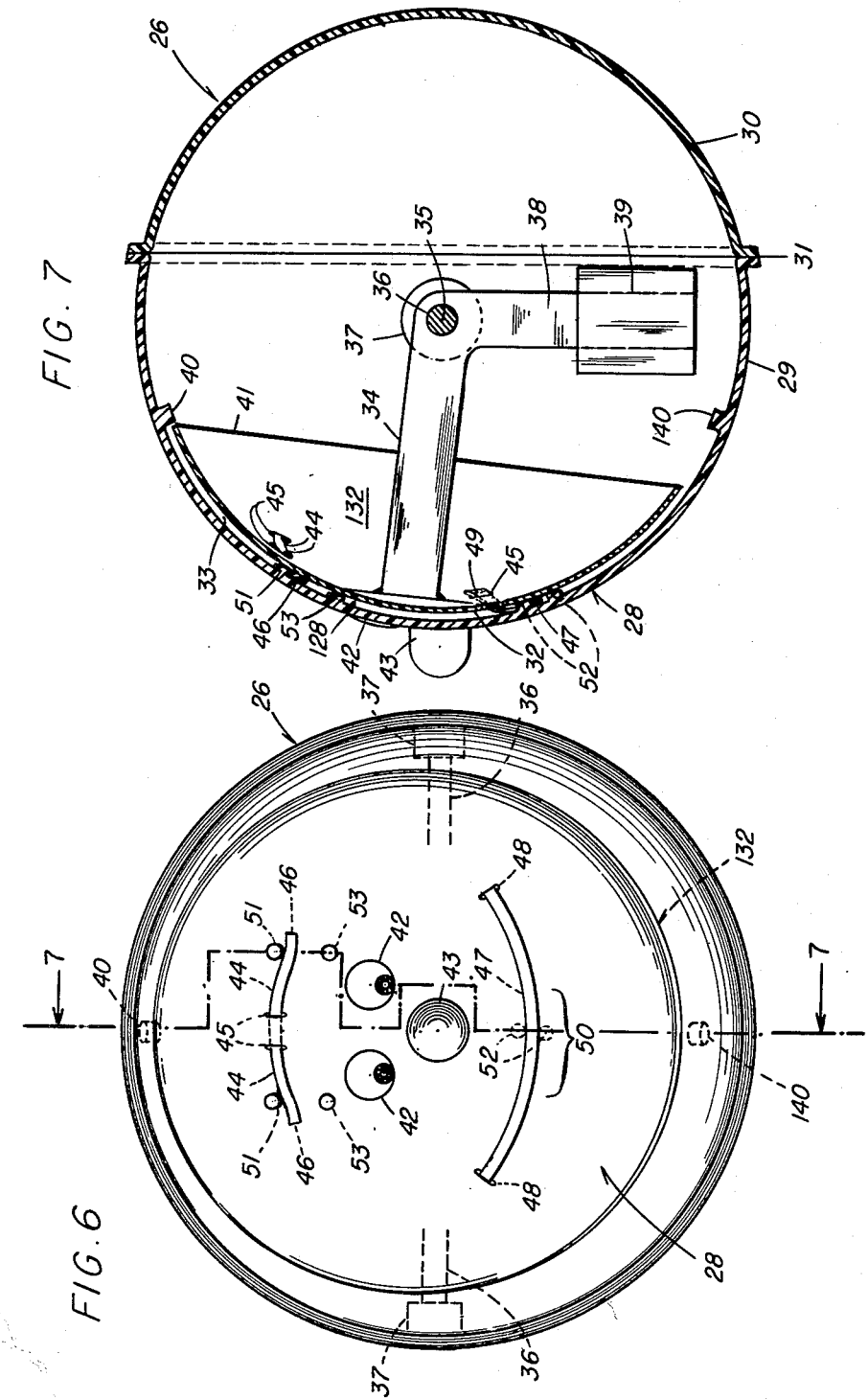

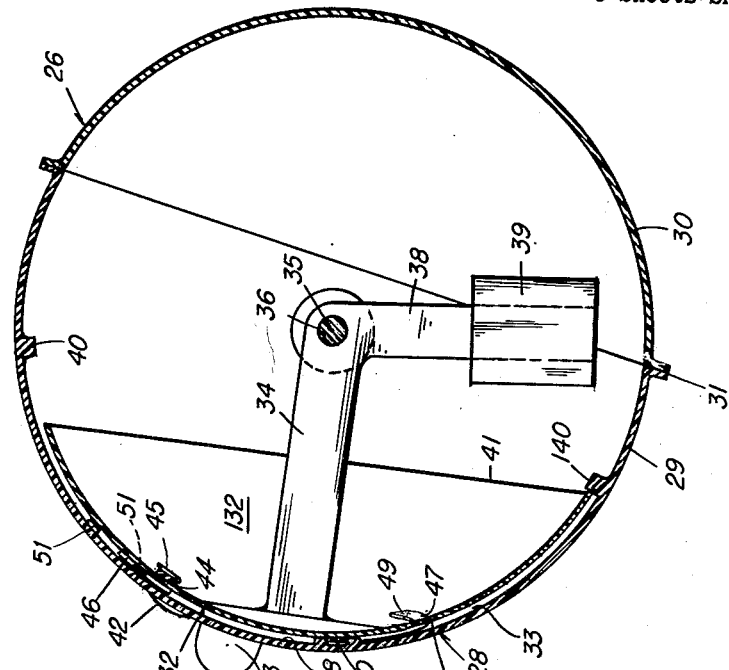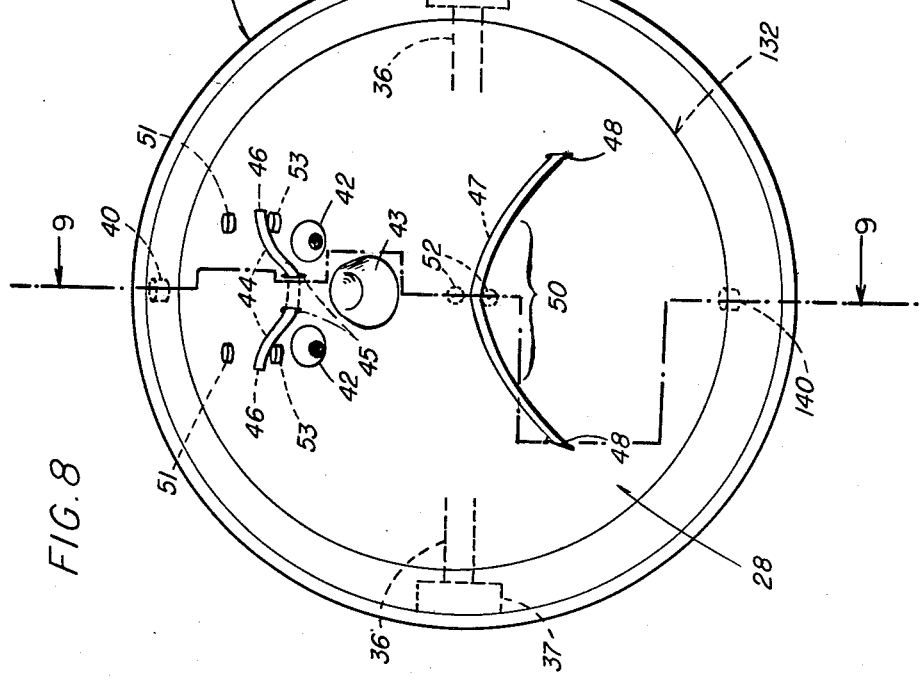

April 27, 1965 P. H. KNOTT 3,180,054
ANIMATED DOLL'S FACE
Filed Aug. 27, 1963 5 Sheets-Sheet 5
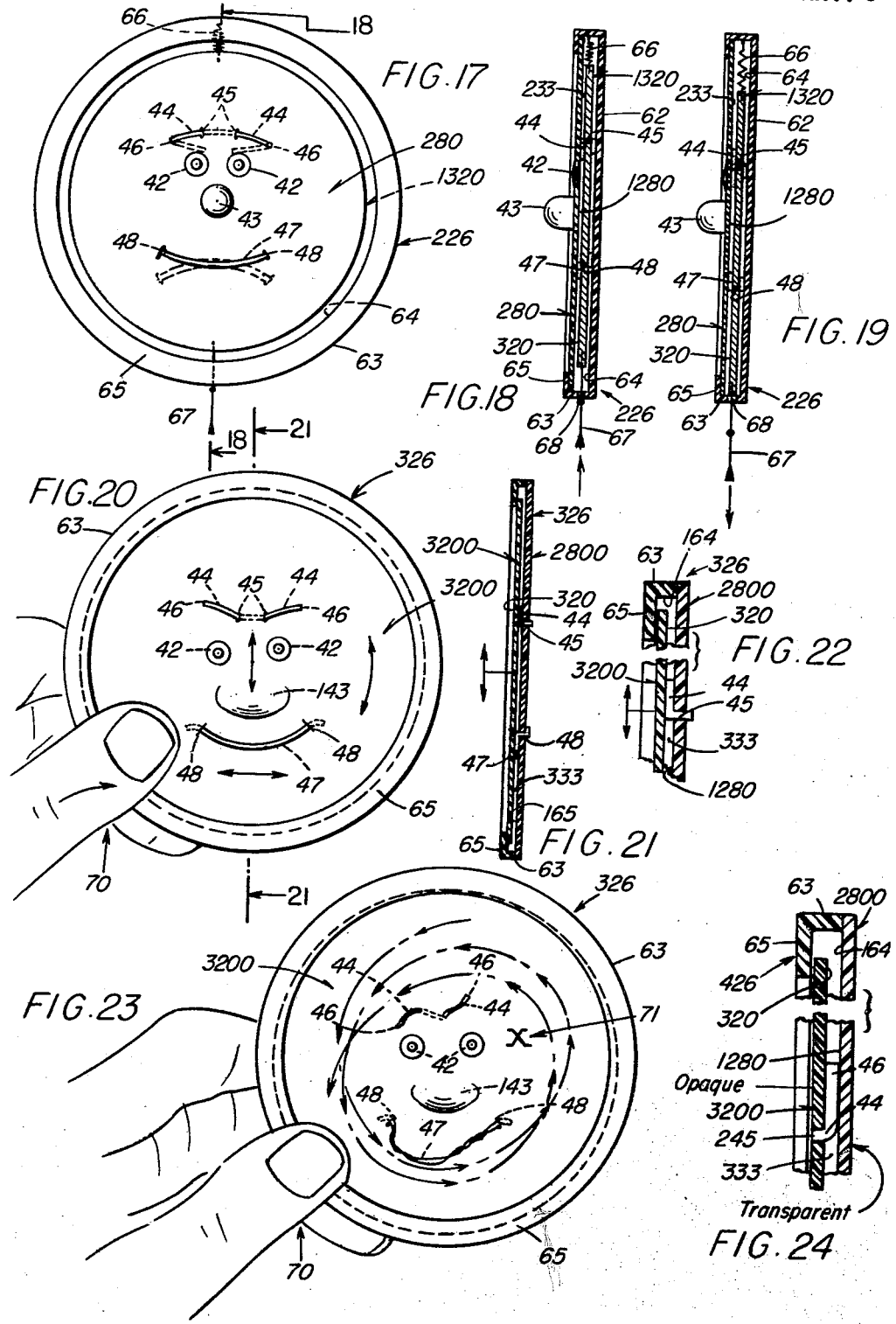

United States Patent Office 3,180,054
Patented Apr. 27, 1965

3,180,054
ANIMATED DOLL'S FACE
Philip H. Knott, New York, N.Y.
(202 South St., Apt. A2, Sausalito, Calif.)
Filed Aug. 27, 1963, Ser. No. 304,806
20 Claims. (Cl. 46—135)

The present invention relates to an animated doll's face of the type in which certain conventional facial features thereof may be manipulated for animation thereof to effect change in expression.

Prior to the present invention, various types of doll face constructions have had facial features thereof animated by various means. For example, simulations of eyeballs have been pivotally supported so that they can be swung back in eye socket apertures with movement of the doll head to make it appear that the doll closes and opens its eyes. Other proposals have involved constructing certain surface areas or features of the doll face from elastomeric sheet material and providing means whereby such areas may be stretched or distorted to change the facial expression. It is an object of the present invention to define certain of the facial features which can be indicated in the form of separate elongated lines by forming such lines in the form of flexible distortable strips, each anchored at one or more points and having one or more free portions capable of being flexed and distorted to different linear shapes so as to animate the particular facial feature defined thereby by virtue of engagement of the free portion of each distortable strip by means which move relative to parts to which such strips are anchored upon manual manipulation of the animated doll's face device.

Various embodiments of the animated doll's face of the present invention have associated in combination an inner extended background facial surface and an outer extended transparent facial plate covering the background surface with a rear surface or back face of the transparent plate opposed to the background surface to provide a relatively small intervening action space therebetween. Means are provided to guide relative movement of the facial plate over the background surface substantially parallel thereto. By "parallel" is meant in the direction of the disposition of the surface, so that when such surface and plate are substantially flat they will have relative straight line motion. If the background facial surface and the covering plate are shaped in the form of spherical segments, with the former nested in the latter, they will have relative curvilinear motion about a common axis which will be the common center of the spheres of which these elements are segments.

Means are provided on either the background surface or on the covering plate, or on both, which together define various facial features including eyes, a nose, a mouth and a pair of eyebrows with the mouth and eyebrows being in the form of separate elongated lines. At least some of the elongated mouth and eyebrow lines are in the form of elongated flexible strip means located in the intervening action space between the background facial surface and the covering transparent facial plate. In various embodiments, each of the pair of eyebrows and the mouth is defined by such flexible strip means with each strip being anchored to one of the opposed background and rear plate surfaces at at least one point. Each flexible strip has a free portion which is capable of being flexed and distorted to different linear shapes between these surfaces to animate the facial feature defined thereby. Means are provided on the other of the opposed surfaces to engage the free portion of each strip to flex and distort it upon relative parallel motions of the opposed surfaces. Such engaging means may be in the form of projections or lugs carried by one of the surfaces against which the free portion of the flexible strip will drag when its anchored portion is moved relative thereto.

Another object of the present invention is to provide certain embodiments of the invention which will permit automatic attainment of the flexing and distortion of the elongated flexible strips in manipulating the entire device to different orientations, and others in which the animated action may be produced by manual manipulation of operators extending to the exterior of the devices, while still others will permit the animated action to be attained by finger engagement of an exposed area of one of the members which is movable relative to the other.

A further object of the present invention is to provide it in the form of relatively economical and small units which may be packed as premiums in packages of various products, such as dry cereals, as gifts for children. Such a form of the device may be in the nature of a relatively flat box which has a back plate and a circumscribing sidewall mounted thereto, so that together they define a chamber of certain transverse dimensions which has front and back sides. In such embodiments of the device a substantially flat movable plate is loosely mounted in the chamber with at least some of its transverse dimensions being less than similar ones of the chamber to allow motion of this plate in its plane. Means are provided to confine the movable plate in the chamber while permitting planar back and forth motion thereof at least in a certain transverse direction. In these devices a substantially flat surface is provided in the box which is fixed transversely relative to the movable plate with a relatively shallow intervening action space of certain depth being defined between this surface and an opposed face of the movable plate. Elongated flexible strip means are located in the intervening action space defining at least one of mouth and eyebrow facial features and with each strip thereof being anchored to one of the opposed relatively fixed surface and the movable plate face at at least one point while having a free portion capable of being flexed and distorted to different linear shapes for animating the facial feature defined thereby. Parts of the device which intervene a point of observation to one of the front and back sides of the box and the action space are transparent for permitting observation of the one or more flexible strips in the action space. Each animative strip in the action space is closely confined therein between the opposed relatively fixed surface and the movable plate face whereby frictional drag on the free portion of the strip in motion of the opposed surface and the face relative to each other will flex and distort the linear shape of the strip free portion. Means define on surface areas of the device observable from the point of observation the remainder of the facial features which are not defined by these flexible animative strips, such as the eyes and nose.

Such a flat box type of embodiment may be circular in form with the movable plate constituting a chamber closing front disk and the back plate being another disk spaced therefrom to define therebetween the intervening action space in which the flexible distortable strips are located. The circular sidewall may carry an inwardly-extending transverse annular flange with the movable front disk being of a diameter intermediate the internal diameters of the circular sidewall and the annular flange to confine the front disk within the chamber while permitting oscillatory as well as back and forth motion of the latter relative to the back disk by manual engagement of the outer exposed side of the face disk by one's finger. Either one or both of the front and back disks may be made transparent to permit one to see through to the intervening action chamber and observe the animation of the distortable flexible strips therein. If the action is to be observed through the movable front disk the latter will be transparent, and the back disk may be either transparent or opaque and have defined on its inside surface, such as by printing or painting, other facial features, e.g., the eyes and nose. If observation of the action is to be provided through the back disk it will be transparent and carry on either the outer or inner sides thereof such fixed facial features, and the movable disk may be either transparent or opaque.

Other objects of the invention will in part be obvious and will in part appear hereinafter.

The invention accordingly comprises the features of construction, combinations of elements, and ararngement of parts, which will be exemplified in the constructions hereinafter set forth, and the scope of the invention will be indicated in the claims.

For a fuller understanding of the nature and objects of the invention reference should be had to the following detailed description taken in connection with its accompanying drawings, in which:

FIGURE 1 is a front elevational view of a doll provided with a globular head which embodies the animated doll's face of the present invention;

FIG. 2 is an enlarged sectional detail, with parts broken away, of a portion of a doll's face similar to that illustrated in FIG. 1 with slight variation of animated parts;

FIG. 3 is an enlarged front elevational view of a form of the doll's head and face depicted in FIG. 1, modified in the manner shown in FIG. 2;

FIG. 4 is a side elevational view, with parts broken away and in section, of a doll's face construction of the general types illustrated in FIGS. 1 to 3 incl., and indicating lever means thereof which may automatically animate certain facial features when the doll's head is bowed forward or tilted upward;

FIG. 5 is a side elevational view, with parts broken away and in section, of another portion of the doll's head and depicting automatic operating lever means of a type similar to that shown in FIG. 4 having associated therewith certain stop means to limit relative swing of face parts in the bowing and tilting action of the face;

FIG. 6 is an enlarged front elevational view, similar to FIG. 3, of the embodiment of the animated doll's head and face of the present invention illustrated in FIG. 1;

FIG. 7 is a transverse sectional view taken substantially on line 7—7 of FIG. 6, parts being shown in their relative positions to attain a smiling or pleased expression;

FIG. 8 is a view similar to FIG. 6 of the structure shown therein indicating the relative disposition of parts in attaining a scowling or dour expression;

FIG. 9 is a cross-sectional view taken substantially on line 9—9 of FIG. 8;

FIG. 10 is a perspective view of a further embodiment of the present invention in which parts are telescoped together for relative longitudinal movement, illustrating relative disposition of parts in attaining a pleased or smiling expression of the doll's face;

FIG. 11 is a perspective view similar to FIG. 10 showing the relative disposition of parts in attaining a scowling expression on the doll's face;

FIG. 12 is a top end view of the body portion of the doll construction shown in FIGS. 10 and 11;

FIG. 13 is a side elevational view of the doll body portion shown in FIG. 12, with parts broken away and in section;

FIG. 14 is a top plan view, with parts broken away, of the head portion of the doll construction shown in FIGS. 10 and 11;

FIG. 15 is a side elevational view, with parts broken away and in section, of the head structure shown in FIG. 14;

FIG. 16 is an axial section, with parts broken away, of the top portion of the body portion and the head portion of the doll construction shown in FIGS. 10 to 15 incl., showing relative disposition of the telescoped parts to attain the scowling expression of FIG. 10;

FIG. 17 is a top plan view of a simplified flat box form of the device of the present invention, showing in full lines relative disposition of parts in the attainment of a pleased or smiling expression and in dotted lines their relative dispositions when a scowling or dour expression is attained;

FIG. 18 is a sectional view taken substantially on line 18—18 of FIG. 17;

FIG. 19 is a sectional view similar to FIG. 18, showing the relative dispositions of parts of the FIG. 17 construction when manipulated to attain a dour or scowling expression of facial features;

FIG. 20 is a top plan view similar to FIG. 17 of a variation of the flat box form illustrated in FIGS. 17 to 19 incl., depicting the device being held in a person's hand;

FIG. 21 is a sectional view taken substantially on line 21—21 of FIG. 20;

FIG. 22 is an enlarged sectional detail of structure shown in FIG. 21;

FIG. 23 is a top plan view similar to FIG. 20, illustrating the action of certain observed facial features during animating manipulation of a movable part thereof attainable by finger engagement for oscillatory motion of this part; and FIG. 24 is an enlarged sectional detail similar to FIG. 22 showing a variation of anchorage of certain animated parts thereof.

Referring to the drawings, wherein like numerals identify similar parts throughout, it will be seen from FIG. 1 that a form of the present invention may be desirably incorporated in a doll, illustrated at 25. In this embodiment the head 26, when bonnet 27 is removed therefrom, may be in the form of a globe of transparent material, such as relatively rigid plastic, e.g., polystyrene and the like, the face portion of which is indicated at 28 in FIG. 1. The face portion 28 and associated animating structure located therebehind constitute an embodiment of the animated doll's face of the present invention.

Details of the doll's head and the animated face embodied therein as employed in FIG. 1 may be of the structure illustrated in FIGS. 6 to 9 incl., or the variation of FIGS. 2 and 3 described later. It will be seen from FIGS. 6 to 9 incl. that the globular shell 26 may be formed from a pair of opposed concave sections 29 and 30, suitably cemented or otherwise anchored together along a seam line 31. In order to locate diametrically therein a transverse or lateral shaft for support of operative animating structure, preferably the concave front shell section 29 will constitute a larger part of the sphere than does the opposed concave back shell section 30. It will be understood from FIGS. 7 and 9 that the facial section 28 is a spherical segment of the globular shell 26 and consists of an outer extended transparent facial plate covering an inner extended background facial surface 32.

The background facial surface 32 preferably is provided by a spherical segment 132 of a globular shell of lesser diameter, so as to be nested within the outer extended transparent facial plate 28 for free rotation relative thereto, with an intervening action space 33 of relatively small depth defined therebetween.

As will be understood from FIGS. 7 and 9, the inner spherical segment 132, the outer surface of which provides the inner extended background facial surface 32, may be pivotally supported by a lever member 34 behind the extended transparent facial plate segment 28 for free swing relative thereto with substantial maintenance of the depth dimension of the intervening action space 33. The lever 34 is pivotally supported about a transverse axis 35 by a lateral shaft 36 having its ends supported in suitable sockets 37 fixedly mounted to the inner surface of the shell section 29 (see FIGS. 6 to 9 incl.). The lever 34 may have a depending arm 38 suspended therefrom and fixed thereto so as to form together a bell crank. This bell crank 34, 38 either may be rotatably supported on the transverse shaft 36 fixedly carried by the sockets 37 or, the latter may constitute bearing cups for the ends of this shaft with the bell crank fixed to the latter to turn therewith, in either case providing structure for allowing the inner spherical segment 132 to be swung up and down about the transverse axis 35.

The lever 34 may be caused to maintain its substantially forwardly-extending orientation, indicated in FIGS. 7 and 9, even though the outer spherical segment shell 28 is swung through a limited distance about this transverse axis up and down as a result of bowing the doll's head down or forward or tilting it up and back. This desirable end may be attained by a pendulum weight 39 carried by the bottom end of the suspending arm 38.

This up and down swing of the inner spherical segment or cupped shell 132 relative to the outer transparent facial plate 28 may be limited in amount by suitable stop means cooperatively mounted within the globular head, or shell section 29 thereof, and on the inner spherical segment 132. As is indicated in FIGS. 7 and 9, such cooperative stop means may be in the form of a top lug 40 and a bottom lug 140 fixed within the cupped shell section 29 in the path of portions of the rear edge 41 of the inner spherical segment 32. Thus, when the globular head 26 is bowed forward, as is illustrated in FIGS. 6 and 7, to swing the facial plate section 28 about the transverse axis 35, the maintenance of the orientation of the front face 32 of the inner spherical segment 132 by the bell crank 34, 38 and the pendulum weight 39 will cause the back edge 41 of this inner spherical segment to engage inwardly-extending lug 40 constituting the top shell stop. If now the spherical head 26 is tilted back or upward, as is illustrated in FIGS. 8 and 9, the inner spherical segment 132 will be maintained in its relative orientation by bell crank 34, 38 and pendulum 39, while the outer facial plate section 28 is pivoted upwardly about the transverse axis 35 until the back edge 41 of the inner segment abuts the lower stop lug 140.

While FIGS. 7 and 9 illustrate that the inner spherical segment 132 may be in the form of a cupped shell section it is to be understood that it may vary in structure so long as it provides the forwardly facing spherical segmental surface 132 opposed to the back face 128 of the outer facial plate 28 with the intervening action space 33 defined therebetween. While, in accordance with the present invention, animated facial features are located in the intervening action space 33, other facial features which may be of a relatively fixed nature may be carried either on the inside surface or on the outer face of the facial plate 28. For example, simulations of a pair of eyes 42 and of a nose 43 may be carried by or defined on the outer surface of the extended transparent facial plate section 28.

While the outer facial plate section 28 should be transparent in order to permit one to observe any animation action in the intervening action space 33, the inner spherical segment 132 may be opaque and of a flesh-like pink hue. Either the outer surface 32 of the inner segmental section 132 and the inner or outer surfaces of the outer facial plate section 28 may carry additional feature simulating markings, such as fold or wrinkle lines and cheek highlights.

Remaining facial features which are to be animated are mounted in the intervening action space 33, these elements being employed for simulating such of the facial features which are elongated lines, e.g., one or both of the arched eyebrows and the bowed lips of the mouth. The facial feature-simulating elements which are to be animated are in the form of elongated flexible strip means and, for example, a separate such strip may be employed for each of these features. Each eyebrow may be defined by an elongated flexible strip section 44, which may be sections of a single continuous strip extending through a pair of laterally-spaced slots 45 in the inner segmental section 132 for anchorage thereto with its opposite ends extending along the front face 32 of this section to constitute free and distortable end portions 46, as will be seen from FIGS. 1 and 6 to 9 incl. The mouth may be defined by a single such elongated flexible strip 47 having its opposite ends extending through laterally-spaced slots 48 in the inner shell section 132 to anchorage therebehind at 49, such as by cement, as will be understood from FIGS. 6 to 9 incl. Thus, the intermediate section 50 of the elongated mouth-simulating strip 47 will be free for flexure and distortion while the ends thereof are anchored to this inner segmental section at the laterally-spaced points defined by the slots 48. The flexible strips or sections thereof 44 and 47 may be formed of any suitable elastomeric material, and thus may be provided as rubber strands either rectangular or round in cross-section.

The smiling or pleased expression which is illustrated in FIG. 6 may be obtained by flexing the free end portions or outer ends 46 of the eyebrow strips 44 downwardly to curve them in the simulation of the conventional arched shapes of eyebrows when the skin above the bridge of the nose is relaxed. Also, such expression may be implied by curving the ends of the mouth line upwardly as may be attained by depressing the central free portion 50 of the strip 47 downwardly. For this purpose, the inner face 128 of outer shell section 28 may be provided with a pair of inwardly-extending lugs 51 which extend an appreciable distance across the depth of the intervening action space 33. These lugs 51 are so located that when the outer convexed facial plate section 28 is swung downwardly relative to the inner spherical segment section 132 the free end portions 46 of the eyebrow strips 44 will be engaged against the lower sides of the lugs 51 to drag the outer free ends of these portions downwardly, as is indicated in FIGS. 6 and 7. The medial free portion 50 of the mouth strip 47 is located between a pair of vertically spaced lugs 52 which are also carried on the inner face 128 of the facial plate section 28, to extend an appreciable distance across the depth of the intervening action space 33, as will be seen from FIGS. 6 and 7. Thus, the lugs 51 bow the outer free ends 46 of the eyebrow strips 44 downwardly and the lugs 52 carry the medial portion 50 of the lip strip 47 down below the end anchorages at 48 of the latter to give the mouth an upward bow, to simulate a pleased expression as is illustrated in FIG. 6.

If, now, the doll head 26 be tilted back or upward to swing the outer facial plate portion 28 upward relative to the inner shell section 132, the lugs 52 will be moved upwardly relative to the anchorages of the mouth strip at 48, to lift the medial free portion 50 of the mouth strip 47 and give it the downwardly or inverted bowed outline illustrated in FIG. 8. The inner face 128 of the outer facial plate section 28 also carries another pair of inwardly-extending lugs 53, each of which is located in the path of the free end portions 46 of the eyebrow strips 44 to cause them to be dragged upwardly as the medial portion of the common eyebrow strip element is carried downwardly with the upward swing of the outer plate section 28. This causes the eyebrow strips 44 to be disposed obliquely relative to each other in downward converging relation as is characteristic of scowling action, thus to attain the dour expression illustrated in FIG. 8.

The major elements of the FIGS. 2 and 3 embodiment are similar to or like those of the FIGS. 6 to 9 incl. structure, but minor variations of the animated elements and their mountings are exemplified therein. For example, the eyebrow strips 144 may be a pair of separate pieces of elastomeric material or a rubber strand, each haivng its outer end anchored or cemented to the inside surface 128 of the outer cupped shell plate 28, such as at 145, with its inner end 146 free for flexure and distortion. Also, the pairs of eyebrow flexing lugs 151 and 153 may be carried by the outer face 32 of inner cupped section 132 to extend forward into the intervening action space 33, alternately to engage and distort the eyebrow strips 144. FIGS. 2 and 3 also illustrate that the mouth may be simulated by a pair of aligned such strips 147, each having its outer end anchored at 148 to the inside surface 128 of outer shell plate 28, with their opposed inner free ends 150 located respectively between one of two pairs of vertically-spaced lugs 152 mounted on the outer face 32 of the inner cupped section 132. The animating action of these eyebrow and mouth strips 144 and 147 will be attained in a manner similar to that described above with respect to the embodiment illustrated in FIGS. 6 to 9 incl.

While the structure illustrated in FIGS. 6 to 9 incl. proposes that the mechanism employed substantially to maintain the orientation of the inner spherical segment surface 32 be in the form of arm 34 constituting a portion of a bell crank with depending arm 38 thereof carrying pendulum weight 39, other mechanism may be employed for this purpose, as is illustrated in FIGS. 4 and 5. It is therein indicated that such mechanism may be in the form of a lever of the first class having its front section 134 carrying the cupped shell section 132, to provide the inner spherical segment surface 32, with the lever having a rear section 138 extending back from the pivot point 35 provided by the cross shaft 36. Weight 139 will be suspended from the rear lever section 138 at a point carefully chosen to counterbalance the weight of the inner cupped shell section 132 and any structure supported thereon. Such a first class lever structure 134, 138 also may be equipped with a different type of stop means to limit the swing to the outer cupped plate 28 relative to the inner cupped section 132 or its convexed surface 32. As illustrated in FIG. 5, the rear spherical segment 30 of the globular head shell 26 may carry on its inner surface a pair of vertically-spaced and inwardly-extending stops 240 and 340 located on opposite sides of, i.e., above and below, an extension 54 of the rear lever section 138. Thus, when a doll's head embodying the mechanism of FIGS. 4 and 5 is bowed or tilted forward the upward swing of spherical segment surface 32 relative to the outer cupped face plate 28 will be limited by engagement of the lug 340 up against the back terminal end of the stop extension 54, and, conversely, when the doll's head is swung upwardly or tilted back the lug 240 will swing down to engagement of this stop extension for limiting the relative swing. It will be understood that such stop means, as is illustrated in FIG. 5, may be embodied in operative mechanism of the pendulum type illustrated in FIGS. 6 to 9 incl.

In FIGS. 10 to 16 incl. is illustrated a modified form of the invention in which the outer cover plate of the doll's face device and the inner opposed surface between which the animating action space is defined are both curvilinear, but not spherical segments. In the embodiment of FIGS. 10 to 16 incl. the opposed surfaces which define therebetween the animating action space are sections of cylindrical surfaces, and this modification demonstrates that the invention may be practiced without resort to the use of spherical segments. As will be seen from FIGS. 10 and 11 the doll 125 may consist of telescoped tubular sections 129 and 332.

The inner tubular section 332 may have an annular top edge 141, an intermediate section providing a curvilinear face surface 232 and a bottom end 55 suitably supported upon a feet-simulating plate 56 for support of the doll 125 in an upright position. The inner tubular section 332 may be formed of or molded from substantially rigid opaque plastic, which in the facial area 232 may be suitably tinted to simulate flesh color. This inner tubular section 332 preferably is provided with stop means to limit axial telescopic action thereover of the outer tubular section 129. For this purpose, there may be provided on the external surface of the top end of the inner tubular section 332 stop abutments which may be in the form of a plurality of radially-extending protuberances or nibs 241. The nibs 241 may be three in number and uniformly spaced circumferentially at about 120° apart. The mid portion of the inner tubular section 332, which provides the inner facial area 232 may also be provided with a pair of diametrically-located and radially-extending projections to simulate a pair of ears 57, which may be in the form of relatively stiff fins having a degree of flexibility to permit them to be folded or lapped circumferentially about the outer surface of the inner tubular section 332 to permit ready assembly of parts, and may thus be formed as pieces of thick polyethylene sheeting cemented in position. Such ear-simulating fins 57 may also serve as motion limiting stop means as is explained hereinafter. The curvilinear facial surface 232 is provided with the animating features which may include the pair of eyebrow strips 44 anchored at 45, by forming them as free end sections of a single elongated strip of elastomeric material threaded through slots at 45. This facial area also carries as another animating feature another flexible and distortable strip 47 to simulate the mouth, which is anchored at its opposite ends 48 with its intermediate portion being distortable.

The outer tubular section 129 may be in the form of and inverted cup having a transverse closing top end 58, as will be best understood from FIGS. 14 to 16 incl. An annular laterally-extending flange 59 may simulate a hat brim to serve together with the closed top end of the outer tubular section 129 as a simulated hat 60. Below the hat brim flange 59, the curvilinear area 228 of the outer tubular section 129 should be transparent to permit observation therethrough of the eyebrow and mouth simulating animated strips 44 and 47. While for this purpose the entire outer tubular section 129 may be molded from transparent plastic having some rigidity the hat portion 60 thereof may have embodied therein or applied to surfaces thereof desirable opaquing colors. In the facial area 228 of the outer tubular section 129 other facial features, such as simulations of eyes 42 and nose 43, may be fixedly carried by the outer tubular section, either on the inner cylindrical surface or the outer cylindrical surface thereof if they are in the form of painted or printed markings and do not project, or may be applied to the outer surface of this tubular section within the facial area 228 if they have some projecting contour.

The lower end portion of the outer tubular section 129 is provided to opposite sides of the facial area 228 with diametrically-located elongated slots 61 into which the ear-simulating fins 57 will be inserted when the outer tubular section is telescoped down over the top end portion of the inner tubular section 332. The length of each slot 61 may determine the length of the path of axial telescopic motion of the outer tubular section 129 about the top end portion of the inner tubular section 332. However, such motion-limiting stop means may consist of or include an internal annular bead 540 in the outer tubular section 129 which is snapped down over the stop nibs 241, as will be best understood from FIG. 16. Abutment of the top annular edge 141 of the inner tubular section 332 to the inner or bottom face 440 of the transverse top wall 58 of the outer tubular section 129 will constitute the stop which limits downward telescopic motion of the outward tubular section about the top portion of the inner tubular section 332. Lift of the outer tubular section 57 about the top portion of the inner tubular section 332 may be limited by engagement of the internal annular bead 540 up against the nibs 241.

The outer diameter of the inner tubular section 332 is so related to the inner diameter of the outer tubular section 129 as to provide therebetween an animation action space 133 of limited depth, intervening the curved facial surface 232 of the inner tubular section and the inner cylindrical face 328 of the outer tubular section. When these tubular sections are telescoped together in the manner indicated in FIGS. 10, 11 and 16, the eyebrow strips 44 and mouth strip 47 will be located in this animation action space 133 between the opposed areas 232 and 228 which together define the animated doll's face portion of the head structure 126. The inner cylindrical surface 328 of the outer tubular section 129 in the facial area 228 is provided with inwardly-extending nibs 51, 52 and 53, as in the embodiments of FIGS. 1 and 6 to 9 incl., to extend at least partially across the animation action space 133 for engagement of the flexible and distortable portions of the eyebrow strips 44 and mouth strip 47 in the manner previously explained in connection with these other embodiments.

In operation of the embodiment of FIGS. 10 to 16 incl., when the outer tubular section 129 is pushed or telescoped down about the top portion of the inner tubular section 332 as far as is permitted by the stop means, such as the interengaged ear fins 57 and slots 61 or the abutment of the annular top end 141 with the bottom surface 440 of the transverse top end 58, the nibs 51 will engage down against the free end portions 46 of the eyebrow strips 44 and lower them to simulate a relaxed expression. The nibs 52, located on opposite sides of the medial flexible and free portion of the mouth strip 47 will lower this portion to bow the mouth upwardly into a smiling contour. As a result, the animated doll's face 126 is provided with a pleased expression as is illustrated in FIG. 10. When the hat brim 59 is grasped and lifted in the direction of the arrow of FIG. 11, the nibs 52 will lift the flexible medial portion of the mouth strip 47 to bow it downwardly into a pouting or dour contour. The nibs 53 will engage beneath the free end portions 46 of the eyebrow strips 44 and lift them to a scowling expression. As a result, the facial area of the doll's head 126 is given a dour or displeased expression, as is indicated in FIG. 11.

In the embodiment of FIGS. 17 to 19 incl. the animated doll's face device is in the form of a relatively flat box 226 which has a back plate 62 that may be a disk of relatively stiff plastic material, either transparent or opaque. A circumscribed sidewall 63, which is preferably circular or cylindrical, has its circular bottom edge fastened, such as by cement, to the circumferential edge of the disk 63. These members together define a chamber 64 of certain transverse dimensions having front and back sides with the latter closed by the disk 62. The cylindrical sidewall 63 has its front edge provided with an inwardly-extending transverse circumambient flange 65 with the hole described thereby being of certain transverse dimensions. The flange 65 may be molded integral with the sidewall 63. Chamber 64 defined by these elements in the FIGS. 17 to 19 incl. embodiment is closed by a face plate 280 of larger diameter than the hole defined by the circular flange 64 to be maintained securely mounted therein. The face plate 280 may also be made of sheet plastic material such as in the form of a relatively stiff disk thereof, and it should be transparent if the back plate 62 is opaque to permit observation of action in the chamber 64.

Within the chamber 64 of the device 226 of FIGS. 17 to 19 incl., between the back plate 62 and the face plate 280 thereof, is loosely mounted a substantially flat movable plate or disk 1320 which is of substantially less transverse dimensions than the internal transverse dimensions of the chamber, e.g., of appreciably less diameter. While the movable plate 1320 may thus be permitted motion in various radial directions relative to the back disk 62 and face plate 280, it is confined to straight line motion in this embodiment by connecting it at one point to the sidewall 63 with a biasing tension spring 66. At a diametrically opposite point a pull cord 67 is connected to the movable plate 1320 and extends out through a hole 68 in the sidewall 63.

While opposed faces of the back disk 62 and the movable plate 1320 may define therebetween the animation action space if this back plate is transparent to permit observation of the action therein, or if both the face plate 280 and the movable plate 1320 are transparent to permit one to see through both of them to such intervening space, one may employ a space between the front surface 320 of the movable plate and the back face 1280 of the front plate 280 as such animation action space in which animating elements may be located. For this purpose, the movable plate 1320 may be slotted at transversely-spaced points 45 and a strand of elastomeric material threaded therethrough to provide on its front surface 320 terminal end sections 44 of the strand to serve as the distortable eyebrow elements. Likewise, a mouth simulating element in the form of an elastomeric strand 47 may have its ends fixed at laterally-spaced points 48 to front surface 320 of the movable plate 1320, such as by being threaded into holes therein and anchored by cement. The intervening animation action space 233 between the front surface 320 of the movable plate 1320 and the back face 1280 of the front plate 280 should be of a depth slightly less than the transverse dimension or diameter of the elastomeric strands forming the eyebrow and mouth elements 44 and 47 when this strand of material is relaxed. As a result, there will be appreciable gripping or frictional engagement of the free distortable portions of these elastomeric strand elements between these opposed surfaces. Thus, when the anchorage points thereof are translated transversely of the device at least the free end portions 46 of the eyebrow elements will be appreciably gripped to tend to maintain them at the points of their original locations. Distorting swing of the intermediate portions of the eyebrow elements 44 between their free ends 46 and their anchor points 45 will be permitted at least to a degree since moving of the latter will tend to stretch such intervening portions to reduce the cross-section or diameter thereof for at least partially freeing this intermediate portion of each from the gripping action. The mid-portion of the mouth strand element 47 will also tend to be gripped in like fashion, so that any transverse motion of the anchorage points 48 of the ends thereof will tend to distort the linear shape of the mouth element. It will be understood that the elastomeric strands from which the eyebrow elements 44 and the mouth element 47 are formed may be of various cross-sectional shapes, such as either circular or square, while assuring that such distorting action is attained.

Other facial features, such as a pair of eye-simulations 42 and a simulation of a nose 43 may be applied by printing or painting these features on either the inner or the outer surfaces of the face plate 280, unless such simulations have projecting contour in which case they will be mounted on the outer surface thereof, as is proposed in FIGS. 18 and 19 with respect to the protruding nose simulation 43.

In operation of the embodiment of FIGS. 17 to 19 incl. the assembly of the parts will be such that the eyebrow elements 44 and the mouth element 47 may initially have linear shapes to give a pleased expression to the doll's face defined by the eyes 42, nose 43, eyebrows 44 and mouth 47 simulations. When pull is applied to the cord 67 the movable plate 1320 will be caused to move diametrically across the chamber 65, or down as the device is viewed in FIG. 17, thereby stretching the biasing springs 66 and distorting the eyebrow elements 44 and the mouth element 47 to linear dispositions indicated in dotted lines therein. Such action is illustrated in FIG. 19, which results in transforming the expression of the doll's face to one of dourness or displeasure. When the pull cord 67 is released the spring 66 will contract to pull the movable plate 1320 back to its original position, as is indicated in FIG. 18.

The simplified embodiments illustrated in FIGS. 20 to 24 incl. are of the flat box type in which a back plate 2800 may be in the form of a disk having its circumferential edge anchored or cemented to an annular edge of a circular or cylindrical sidewall 63, with the latter provided with an overhanging and inwardly-extending flange 65. This structure defines an internal chamber 164 in which is loosely mounted a movable plate or disk 3200 which has an outer diameter greater than the internal diameter of the annular flange 64 to maintain it within chamber 164. The diameter of the movable disk 3200 is appreciably less than the internal diameter of the sidewall 63, i.e., its diameter is intermediate the internal diameters of this sidewall and the overhanging flange 65, to permit oscillatory as well as back and forth motion of this movable front plate relative to the fixed back plate 2800. The front face 1280 of the back plate 2800 and the back surface 320 of the movable front plate 3200 define therebetween the animation action space 333.

Thus, if animation of elements disposed in this intervening action space 333 are to be observed from the back side of the device of FIGS. 20 to 23 incl. the back disk 2800 will be transparent and the movable disk 3200 will be either transparent or opaque. As is proposed in FIGS. 20 to 22 incl. the animated facial features may be in the form of eyebrow elements 44 and mouth element 47 of elastomeric strand material previously described. The depth of the intervening animation action space 333 will be slightly less than the relaxed cross-sectional dimension of such strand material for the reason indicated with respect to FIGS. 17 to 19 incl. Anchorage of the eyebrow portions 44 of a single elastomeric strand may be provided by laterally-spaced slits at 45 in the back plate 2800 through which the strand is threaded to provide on its front face 1280 the observable eyebrow elements 44. Likewise, the mouth simulating strand 47 may be anchored to the back plate 2800, such as by having its ends thereof threaded through slits in the latter and cemented in position.

In operation of the embodiment illustrated in FIGS. 20 to 22 incl. the device may be grasped in one hand, a portion of which is indicated at 70 in FIG. 20 The operator may then frictionally engage the outer face of the movable disk 3200 at any selected point and apply to and fro straight line motion thereto, or spiral or oscillatory action, as may be desired. Eye simulations 42 and nose simulation 143 may be applied at fixed points to the front face 1280 of the back plate 2800, so that together with the animation eyebrow elements 44 and the mouth element 47 a doll's face is provided.

FIG. 23 illustrates certain animating action that may be attained with the FIGS. 20 to 22 incl. embodiment if the device 326 is held in one's hand, as is illustrated at 70, and an instrument (such as the eraser on an end of a pencil) or one's finger is frictionally placed at a selected point, such as that indicated at 71 marked "X," and circular motion given to the movable disk 3200. During such circular or spiraling motion of the movable plate 3200 the free end portions or eyebrow elements 44 will be distorted to various shapes, as will be the intermediate distortable portion of the mouth simulating element 47, to give various changing expressions to the doll's face. Such a simple device will provide children with considerable pleasure due to the various expressions that may be imposed upon the doll's face by the animation of the eyebrow elements 44 and mouth element 47 thereof.

It is indicated in FIG. 24 that the animating elements or strands, e.g., each eyebrow element 44, may be anchored to the movable plate or disk 3200, such as by having an end or an anchoring portion thereof inserted in a slot 245 therein and secured by cement or the like. In such case, the movable plate 3200 may be opaque and carry on its inside surface 320 the eye simulations 42 and a nose simulation 143 in the nature of printed or painted pictorial representations or outlines. Action within the animation space 333 of the distortable elements 44 and 47 may be observed through the fixed back plate 2800 in the event that this is transparent, and it will be understood that the rear face of this back disk or plate may carry the relatively fixed eyes and nose simulations.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An animated doll's face comprising, in combination,
   (a) an inner extended background facial surface,
   (b) an outer extended transparent facial plate covering said background surface and having a rear surface opposed to the latter with a relatively small intervening action space provided therebetween,
   (c) means to guide relative movement of said plate over said background surface substantially parallel thereto,
   (d) means on at least one of said background surface and covering plate defining various facial features including eyes, a nose, a mouth and a pair of eyebrows with the mouth and eyebrows being in the form of separate elongated lines,
   (e) at least some of said elongated mouth and eyebrow lines being in the form of elongated flexible strip means located in the intervening action space with each strip means thereof being anchored to one of said opposed background and rear plate surfaces at at least one point and having a free portion capable of being flexed and distorted to different linear shapes between said surfaces to animate the facial feature defined thereby, and
   (f) means on the other of said opposed surfaces to engage the free portion of each strip means to flex and distort it upon relative parallel motions of said opposed surfaces.

2. The animated doll's face as defined in claim 1 characterized by said background surface and said covering plate being convexed in the same direction.

3. The animated doll's face as defined in claim 2 characterized by said convexed background surface and covering plate being spherical segments with the former being pivotally mounted in the latter for swing relative thereto.

4. The animated doll's face as defined in claim 3 characterized by said plate defining a facial area of a doll's head, lever means pivotally supported to said plate and carrying said background surface, and weight means carried by said lever means to maintain its orientation when said plate is tilted forward in the bowing of such doll's head, the eyebrows and mouth being defined by said flexible strip means which are deflected from a pleased expression to a dour expression when the head is tilted forward in the bowing.

5. The animated doll's face as defined in claim 4 characterized by said lever means being arranged laterally and extending forward from the point of pivotal support to connection with and support of said background surface with said weight means depending from said lever means to maintain its lateral orientation.

6. The animated doll's face as defined in claim 1 characterized by said engaging means to flex and distort said eyebrow and mouth strip means being projecting lugs on the surface opposed to that to which said strip means are point anchored.

7. The animated doll's face as defined in claim 6 characterized by stop means mounted between said background surface and said plate to limit motion of one relative to the other whereby said strip means are maintained in operation relative to respect to said flexing lugs to prevent disabling freeing of said strip means from the flexing influence of said lugs.

8. The animated doll's face as defined in claim 1 characterized by said background surface and said covering plate being complementary segments of cylindrical structures translatable longitudinally relative to each other normal to their curvatures.

9. The animated doll's face as defined in claim 1 characterized by said background surface being the face of a relatively flat disk with said plate being a complementary relatively flat disk.

10. The animated doll's face as defined in claim 1 characterized by said intervening space being slightly less than the thickness of the free portions of said strip means whereby the means engaging the latter are surface areas having snug frictional engagement thereof for drag distortion.

11. An animated doll's face comprising, in combination,
   (a) a transparent facial shell in the form of a spherical segment having defined thereon simulations of a pair of eyes and a nose,
   (b) an inner background facial surface provided by a spherical segment of opaque material nested within said shell and spaced a limited distance radially inward of the inner surface of the latter,
   (c) means pivotally supporting said background facial surface within said shell about a transverse axis for up and down swing relative thereto,
   (d) weight means connected to said background facial surface and depending below said pivot means tending to keep the former in a particular position of relative orientation regardless of up and down swing of said shell about the pivot axis, so that when the front section of said shell which bears the eyes and nose features is swung upwardly the background facial surface will be located in a downward position therebehind and when the shell is swung downwardly the background facial surface will be located upwardly therebehind,
   (e) stop means connected to said shell and said background facial surface to limit up and down swing of said shell relative to said background facial surface to limit relative travel of opposed surfaces thereof to a predetermined extent,
   (f) elongated flexible strips located between the background facial surface and the inner face of said shell and anchored at points to the former while having free portions capable of being flexed and distorted to different linear shapes for simulating the eyebrows and the mouth of the doll's face, and
   (g) lugs carried by the inner face of said shell extending radially inward into the space between it and the background facial surface to be swung therewith and located for engagement of the free portions of said flexible strips to distort them to different linear shapes with up and down swing of said shell whereby the eyebrow strips may be caused by downward swing of the shell relative to the background facial surface to bow downwardly at their outer ends and the mouth strip to bow downwardly at the center for upward curvature of the ends of the mouth strip to effect a smiling expression and conversely with swing of the shell upwardly relatively to the background facial surface to effect a scowling and pouting expression.

12. The animated doll's face as defined in claim 11 characterized by the spherical segment which carries the background facial surface being in the form of an inner shell fixedly supported upon a forwardly extending lever arm, said weight means being a pendulum connected to said lever arm at the pivot axis for maintenance of the lateral orientation of said lever arm within the limits as permitted by the stop means.

13. The animated doll's face as defined in claim 11 characterized by the elongated flexible strips defining the eyebrows being in the form of a single strip centrally fixed to the background facial surface with its opposite ends constituting the free portions thereof that are capable of being flexed and distorted, the inner face of said outer shell being provided with two pair of inward projections with those of each pair located on opposite top and bottom sides of one of the free ends of said eyebrow strip, the elongated flexible strip constituting said mouth being in the form of a single continuous strip anchored at opposite ends to said background facial surface with the medial section of this strip being free for flexing and distortion and located intermediate a single pair of inward projections on the inner face of said outer shell to be moved up and down thereby when the outer shell is swung up and down.

14. An animated doll's face device comprising, in combination,
   (a) a relatively flat box having
   (b) a back plate and a circumscribing sidewall mounted thereto together defining a chamber of certain transverse dimensions with front and back sides,
   (c) a substantially flat movable plate loosely mounted in said chamber with at least some of its transverse dimensions being less than similar ones of said chamber for at least back and forth motion in its plane in a certain transverse direction,
   (d) means confining said movable plate in said chamber while permitting the transverse motion thereof,
   (e) means providing a substantially flat surface in said box which is fixed relative to said movable plate with a relatively shallow intervening action space of certain depth provided between said surface and a face of said movable plate opposed thereto,
   (f) parts of the device intervening a point of observation to one of the front and back sides of said box and said action space being transparent for permitting observation from said point of elements in said action space and animative action of such elements therein,
   (g) elongated flexible strip means located in the intervening action space defining at least one of mouth and eyebrow facial features with each strip means thereof being anchored to one of said opposed relatively fixed surface and plate face at at least one point and having a free portion capable of being flexed and distorted to different linear shapes to animate the facial feature defined thereby,
   (h) each animative strip means being closely confined in said action spaced between said opposed relatively fixed surface and plate face whereby frictional drag on the free portion thereof in motion of one of said opposed surface and face relative to the other will flex and distort the linear shape of said strip means free portion, and
   (i) means defining on surface areas of the device observable from the point of observation the remainder of facial features which features include eyes, a nose, a mouth and a pair of eyebrows.

15. The animated doll's face device as defined in claim 14 characterized by said flat box having a transparent face plate fixedly supported by said sidewall with said movable plate being mounted in the chamber between said back plate and said face plate, the back face of said face plate being spaced forward of said movable plate to define the intervening action space therebetween with said movable plate carrying each such distortable strip means, said face plate carrying the means defining the remainder of the facial features, and means connected to said movable plate extending to the exterior of said box for manual engagement to permit said movable plate to be moved manually.

16. The animated doll's face device as defined in claim 15 characterized by said manually engageable means being a pull cord extending through a hole in said sidewall to connection with said movable plate for pulling the latter transversely in one direction, and means within said box biasing said movable plate in the opposite transverse direction.

17. The animated doll's face device as defined in claim 14 characterized by said sidewall being provided with an inwardly-extending transverse circumambient flange of less transverse dimensions than said movable plate thereby confining the latter in said chamber as a front closing plate for said box, said movable front plate and said back plate defining therebetween the intervening action space with one thereof being transparent, each distortable strip means being mounted in the intervening action space between the back face of said movable front plate and the inside surface of said back plate.

18. The animated doll's face device as defined in claim 17 characterized by said back plate, said sidewall and said movable front plate being circular with the latter being of a diameter intermediate the internal diameters of said sidewall and annular flange to permit oscillatory as well as back and forth motion of said front plate relative to said back plate by manual engagement of the outer exposed side of said face plate by one's finger.

19. The animated doll's face device as defined in claim 18 characterized by each such distortable flexible strip means being in the form of an elastomeric strand having an appreciable degree of frictional engagement with the opposed back face of said front plate and the inside surface of said back plate.

20. The animated doll's face device as defined in claim 19 characterized by said movable front plate being transparent for observation of each such flexible strip means in said intervening action space located therebehind with the remaining facial features being located on the inside surface of said back plate to be observed through said transparent movable plate.

References Cited by the Examiner

UNITED STATES PATENTS

| | | | |
|---|---|---|---|
| 1,164,816 | 12/15 | Huston | 46—37 |
| 2,720,053 | 10/55 | Knott | 46—135 |

RICHARD C. PINKHAM, *Primary Examiner.*

UNITED STATES PATENT OFFICE
CERTIFICATE OF CORRECTION

Patent No. 3,180,054

April 27, 1965

Philip H. Knott

It is hereby certified that error appears in the above numbered patent requiring correction and that the said Letters Patent should read as corrected below.

Column 3, line 19, for "FIGURE" read -- FIG. --; column 5, line 2, for "37 or," read -- 37, or --; column 6, line 69, for "haivng" read -- having --; column 7, line 29, for "to", second occurrence, read -- of --; column 7, line 31, after "As" insert -- is --; column 8, line 22, for "and" read -- an -- column 12, line 75, for "in operation relative to respect to" read -- in operative relative with respect to --.

Signed and sealed this 21st day of September 1965.

(SEAL)
Attest:

ERNEST W. SWIDER
Attesting Officer

EDWARD J. BRENNER
Commissioner of Patents